(12) United States Patent
Ikebe (10) Patent No.: US 8,107,022 B2
(45) Date of Patent: *Jan. 31, 2012

(54) LIQUID CRYSTAL DEVICE AND ELECTRONIC APPARATUS

(75) Inventor: Tomo Ikebe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 112 days.

This patent is subject to a terminal disclaimer.

(21) Appl. No.: 12/469,956

(22) Filed: May 21, 2009

(65) Prior Publication Data

US 2009/0296036 A1 Dec. 3, 2009

(30) Foreign Application Priority Data

May 28, 2008 (JP) ................................. 2008-139048

(51) Int. Cl.
*G02F 1/1335* (2006.01)
(52) U.S. Cl. ........... 349/5; 349/1; 349/2; 349/8; 349/84; 349/139
(58) Field of Classification Search .................. 349/1, 2, 349/5, 8, 56, 84, 139
See application file for complete search history.

(56) References Cited

U.S. PATENT DOCUMENTS

| 5,764,322 A | 6/1998 | Mamiya et al. |
| 5,847,780 A | 12/1998 | Kim et al. |
| 7,586,564 B2 | 9/2009 | Goto et al. |
| 2009/0296030 A1 * | 12/2009 | Ikebe .......................... 349/110 |

FOREIGN PATENT DOCUMENTS

| JP | 10-170924 | 6/1998 |
| JP | 2000019558 | 1/2000 |

* cited by examiner

*Primary Examiner* — Jennifer Doan
(74) *Attorney, Agent, or Firm* — Lowe, Hauptman, Ham & Berner, LLP (57) ABSTRACT

An LCD having pixels arrayed along a first direction and a second direction crossing the first direction includes: opposite first and second substrates having facing first and second surfaces, respectively; a first light shielding layer formed along the second direction between the pixels adjacent in the first direction on the first surface; a first electrode formed within each pixel on the second surface and having a first electrode portion; a second electrode positioned between the pixels adjacent in the first direction on the second surface to at least partially overlap the first light shielding layer in plan view and having a second electrode portion extending along the first electrode portion; a third electrode having a third electrode portion formed along the first direction between the pixels adjacent in the second direction on the second surface.

10 Claims, 11 Drawing Sheets

LIQUID CRYSTAL DEVICE AND ELECTRONIC APPARATUS

BACKGROUND

1. Technical Field

The present invention relates to a liquid crystal device and an electronic apparatus including the liquid crystal device.

2. Related Art

There is an IPS (In Plane Switching) type liquid crystal display device (hereinafter, referred to as an 'IPS panel') in which liquid crystal is interposed between two glass substrates, a predetermined voltage is applied between electrodes of a common electrode and a pixel electrode formed approximately in parallel for every pixel on one glass substrate surface to thereby generate an electric field in the in-plane direction of the glass substrate, and an image and the like are displayed by controlling the alignment direction of liquid crystal. In the case of the IPS panel, liquid crystal molecules rotate in a direction parallel to a substrate. Accordingly, when viewed from an inclined position, the liquid crystal molecules do not rotate in the polarization direction thereof. For this reason, the IPS panel is widely used as a liquid crystal display device in which a decrease in contrast is small and a viewing angle is large and which has satisfactory display quality.

Moreover, techniques for the improvement in the display quality of the IPS panel are disclosed in recent years. As one of the techniques, for example, JP-A-10-170924 discloses a technique of suppressing the sense of discomfort, which was felt in the related art, by making the viewing angle distribution of contrast symmetrical so that the image contrast of a liquid crystal panel reflected on left and right eyes is equal.

Thus, the IPS panel whose display quality is improved by various disclosed techniques is also used as a high-resolution panel corresponding to direct view type Hi-Vision and a light valve (light modulation device) of a projector, for example, by making pixels fine with an improvement in the display quality.

However, in the IPS panel, a voltage applied to one pixel electrode of adjacent pixels may generate an electric field for a common electrode of the other pixel theoretically. At this time, the generated electric field is small when there is a considerable distance between adjacent pixels. Accordingly, the electric field generated for the common electrode of the other pixel by the voltage applied to one pixel electrode may be interrupted by a signal line, which is used to supply a voltage applied to a pixel electrode, and a scanning line, which is used to supply a control signal that controls application of the supplied voltage to the pixel electrode. For this reason, there was no practical influence on the electric field generated between the pixel electrode of the other pixel and the common electrode.

However, when the pixel pitch is made small in order to meet a request for high-resolution image display in such an IPS panel, the distance between adjacent pixels is decreased. Accordingly, the physical distance between the pixel electrode of one pixel and the common electrode of the other pixel becomes short. Then, since the electric field generated for the common electrode of the other pixel by the voltage applied to one pixel electrode becomes large, the electric field generated between the pixel electrode of the other pixel and the common electrode is influenced. As a result, since the electric field to be originally applied in one pixel is disturbed, a problem that an image to be displayed is not correctly displayed and the display quality is degraded may occur.

SUMMARY

The invention has been made in order to solve at least some of the above-described problems and may be realized as the following forms or application examples.

According to an aspect of the invention, a liquid crystal device having a plurality of pixels arrayed in a matrix along a first direction and a second direction crossing the first direction includes: a first substrate; a second substrate disposed opposite the first substrate; a first light shielding layer that is formed along the second direction in a region, which is positioned between the pixels adjacent to each other in the first direction, of a surface of the first substrate facing the second substrate; a first electrode that is formed within the pixel of a surface of the second substrate facing the first substrate and has an electrode portion extending in a predetermined direction; a second electrode that is disposed corresponding to a region, which is positioned between the pixels adjacent to each other in the first direction, of the surface of the second substrate facing the first substrate and that is formed such that at least a part thereof overlaps the first light shielding layer in plan view and has an electrode portion extending in a direction along the electrode portion of the first electrode; a third electrode that has an electrode portion formed along the first direction in a region, which is positioned between the pixels adjacent to each other in the second direction, of the surface of the second substrate facing the first substrate; and a liquid crystal layer that is interposed between the first and second substrates and is driven by an electric field generated between the first and second electrodes.

According to the liquid crystal device, the degree in which an electric field generated between the first and second electrodes in one of adjacent pixels is influenced by the first electrode in the other pixel can be suppressed by the third electrode. Accordingly, mutual influences of electric fields between the first and second electrodes are suppressed between adjacent pixels. As a result, degradation of the display quality can be suppressed.

In the liquid crystal device described above, preferably, the predetermined direction in which each of the electrode portion of the first electrode and the electrode portion of the second electrode extends is a direction crossing each of the first and second directions.

In this case, when a direction perpendicular to the direction of the first shielding layer is set as the initial alignment direction of liquid crystal molecules in the liquid crystal layer in order to make the viewing angle on the left and right sides symmetrical, the extending direction of the second electrode is inclined with respect to the direction of the first shielding layer. Accordingly, a probability that liquid crystal molecules do not rotate reversely (reverse twist) in the in-plane direction according to an electric field generated between the first and second electrodes but rotate uniformly to be aligned is increased. As a result, since the electric field are not disturbed between adjacent pixels and the viewing angle on the left and right sides with respect to the first shielding layer is symmetrical, a liquid crystal device which does not cause visual discomfort and has good quality can be provided.

In the liquid crystal device described above, preferably, the third electrode is electrically connected to the second electrode.

In this case, in all pixels, the first electrode is surrounded with the same electric potential by the second and third electrodes electrically connected to each other. Accordingly, by surrounding the periphery of the first electrode with the same electric potential between adjacent pixels, mutual influences of the first electrodes are suppressed. As a result, degradation of the display quality can be suppressed.

In the liquid crystal device described above, preferably, the first light shielding layer is formed to have a predetermined width, and the second electrode has a width smaller than the predetermined width and is disposed and formed to be placed within the predetermined width in plan view.

In this case, since the second electrode does not protrude into the pixel, a decrease in light amount of illuminated light caused by making the area of a pixel region small can be suppressed.

In the liquid crystal device described above, preferably, the second substrate has a plurality of insulating layers formed, and the second and third electrodes are formed on the same insulating layer as an insulating layer in which the first electrode is formed.

In this case, the second and third electrodes can be formed without an insulating layer interposed between the first electrode and each of the second and third electrodes. Accordingly, since an increase in the number of insulating layers formed on the second substrate can be suppressed, a decrease in light amount of illuminated light occurring when the light is transmitted through the insulating layer can be suppressed. As a result, degradation of the display quality can be suppressed.

In the liquid crystal device described above, it is preferable to further include a second light shielding layer that is formed along the first direction in a region, which is positioned between the pixels adjacent to each other in the second direction, of the surface of the first substrate facing the second substrate. In addition, preferably, the third electrode is formed at a position where at least a part of the third electrode overlaps the second light shielding layer in plan view.

In this case, the third electrode may be covered by the second shielding layer. Accordingly, even if the second electrode is formed of a metallic material with good conductivity in order to effectively suppress mutual influences of electric fields between the first and second electrodes using the third electrode between adjacent pixels, a decrease in the area of a pixel region occurring due to a metallic material portion with a low transmittance can be prevented. As a result, since the amount of light transmitted through the liquid crystal device is not reduced and a decrease in brightness is suppressed, degradation of the display quality can be suppressed.

In the liquid crystal device described above, preferably, the second light shielding layer is formed to have a predetermined width, and the third electrode has a width smaller than the predetermined width and is formed to extend within the predetermined width in plan view.

In this case, since the third electrode does not protrude into the pixel, a decrease in light amount of illuminated light caused by making the area of a pixel region small can be suppressed. Moreover, since it is possible to form the third electrode with a metallic material having good conductivity, mutual influences of electric fields between the first and second electrodes can be effectively suppressed.

In the liquid crystal device described above, preferably, an end of the electrode portion of the first electrode is formed to extend up to a portion overlapping the second light shielding layer.

In this case, since a power supply portion (contact hole) for the third electrode does not protrude into the pixel, a decrease in light amount of illuminated light caused by making the area of a pixel region small can be suppressed.

In the liquid crystal device described above, preferably, at least one of the first electrode, the second electrode, and the third electrode is a transparent electrode.

In this case, for example, even if the first electrode, the second electrode, or the third electrode exists in a pixel, a decrease in the amount of transmitted light is suppressed because the electrode is transparent. As a result, since the amount of light transmitted through the liquid crystal device is not reduced and a decrease in brightness is suppressed, degradation of the display quality can be suppressed.

According to another aspect of the invention, there is provided an electronic apparatus including the above-described liquid crystal device.

Since the liquid crystal device is a liquid crystal device in which a decrease in brightness is small and degradation of the display quality is suppressed, an electronic apparatus with the good display quality can be provided if the liquid crystal device is mounted in the electronic apparatus. In particular, a projector as an electronic apparatus including the liquid crystal device as a light modulation device of transmitted light is effective in that a bright image can be projected.

BRIEF DESCRIPTION OF THE DRAWINGS

The invention will be described with reference to the accompanying drawings, wherein like numbers reference like elements.

FIGS. 5A and 5B are schematic views illustrating liquid crystal molecules that rotate according to the electric field in a pixel.

DESCRIPTION OF EXEMPLARY EMBODIMENTS

Hereinafter, the invention will be described on the basis of embodiments. Moreover, drawings used in the following description may be shown in different reduced scales for the convenience of explanation, and the actual size or length is not necessarily shown.

Figure 1:
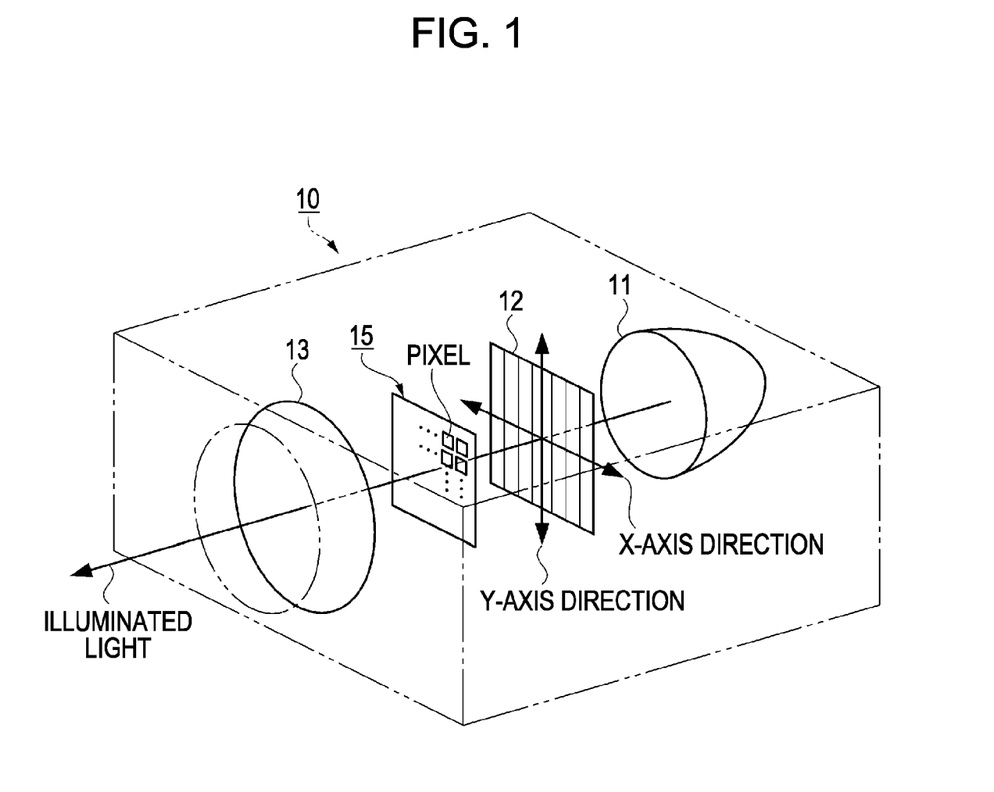
FIG. 1 is a schematic configuration view illustrating a projector including a liquid crystal device according to an embodiment of the invention.

FIG. 1 is a configuration view illustrating the schematic configuration of a projector 10 as an electronic apparatus including a liquid crystal device 15, which is an embodiment of the invention, as a light modulation device (light valve). The projector 10 makes illuminated light, which is illuminated from a light source 11, into light the polarizing direction of which is aligned by a polarization beam splitter 12. In addition, light modulation is performed when the illuminated light whose polarization direction is aligned is transmitted through each pixel provided in the liquid crystal device 15. In addition, the light-modulated illuminated light is projected by a projection lens 13 and an image displayed on the liquid crystal device 15 is projected onto a screen (not shown) provided with a predetermined distance therebetween. Moreover, the projector 10 may also be configured such that the plurality of liquid crystal devices 15 are included and an optical system (for example, a mirror or a cross prism) corresponding to the plurality of liquid crystal devices is formed.

In the present embodiment, the polarization direction of the illuminated light aligned by the polarization beam splitter 12 is set to a Y-axis direction which is a thickness direction (vertical direction in the drawing) of a main body of the projector 10. Although not explained herein, a longitudinal direction or horizontal direction of a display screen may be made to match the polarization direction in many cases from the manufacturing reason of the polarization beam splitter. Therefore, in the present embodiment, the polarization direction is set to the Y-axis direction. In addition, the polarization direction may be set to an X-axis direction perpendicular to the Y-axis direction.

Furthermore, in a state where an image is not displayed on the liquid crystal device 15, that is, in an initial state where a voltage is not applied to each pixel in the liquid crystal device 15, a black state where nothing is projected onto the screen is preferable. Accordingly, in the projector 10 of the present embodiment, the initial alignment direction of liquid crystal molecules in the liquid crystal device 15 is set to the X-axis direction crossing the Y-axis direction, which is the polarization direction of illuminated light, such that the illuminated light is not transmitted at first.

Figure 2:
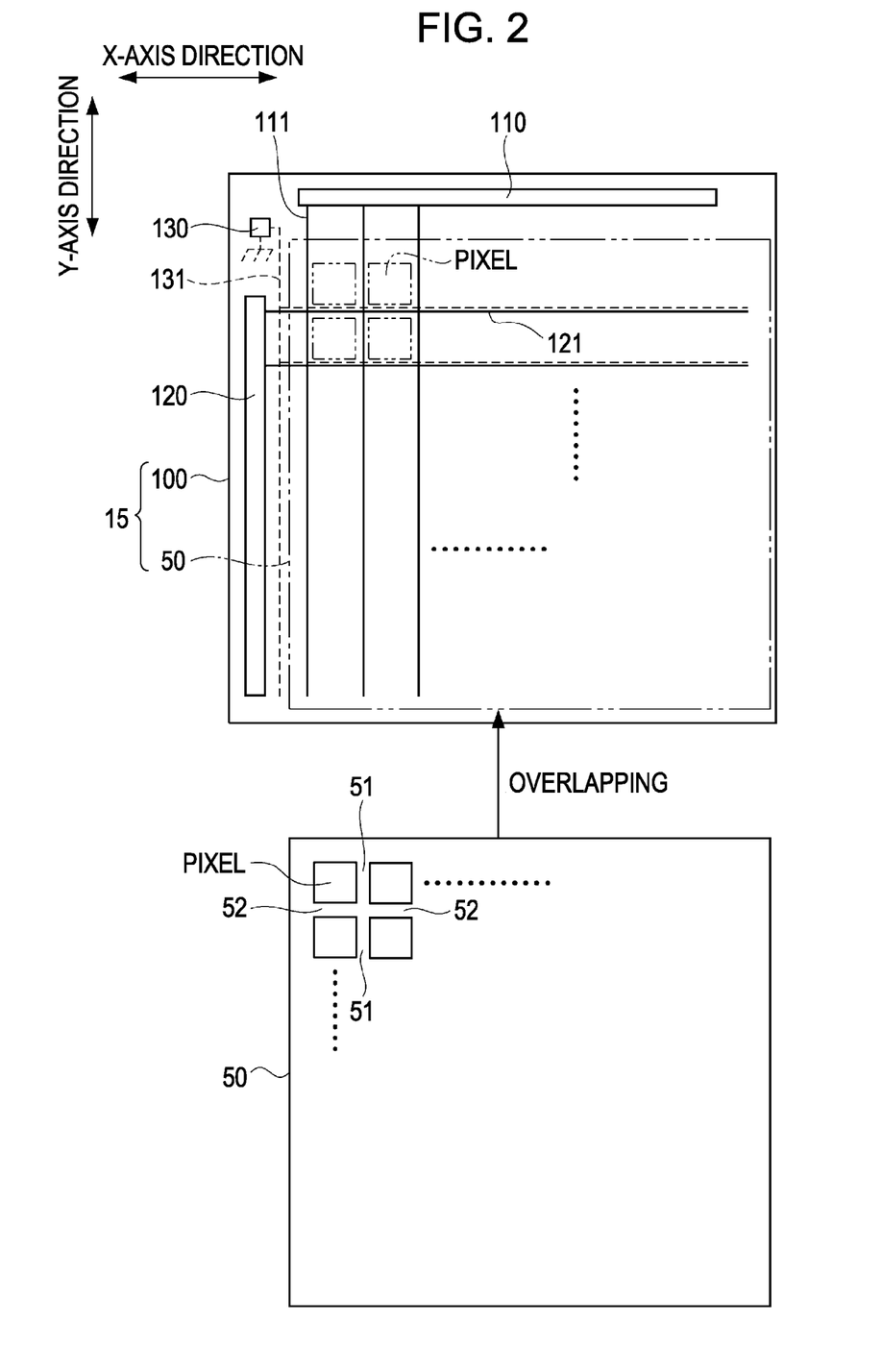
FIG. 2 is an explanatory view schematically illustrating the configuration of a liquid crystal device.

Next, the liquid crystal device 15 will be described. FIG. 2 is an explanatory view schematically illustrating the configuration of the liquid crystal device 15. The liquid crystal device 15 has a structure where a substrate 100 and a substrate 50 overlap each other with a liquid crystal layer, which will be described later, interposed therebetween in a sealed state.

In an outer peripheral portion of the substrate 100, a scanning line driving circuit 120, a data line driving circuit 110, and a power supply terminal 130 are formed on a transparent substrate (surface side of the drawing) formed of glass, quartz, or resin. In addition, scanning lines 121 are wired from the scanning line driving circuit 120 and data lines 111 are wired from the data line driving circuit 110, as shown in FIG. 2. Furthermore, by a voltage supplied through the scanning line 121 to a thin film transistor (not shown; which will be described later) that is formed near a point of intersection of the scanning line 121 and the data line 111 corresponding to each pixel, an ON/OFF control of the thin film transistor is made.

In the present embodiment, the power supply terminal 130 is connected to a ground (GND), a ground potential is supplied to each pixel through a common wiring line 131 connected to the power supply terminal 130. Therefore, in each pixel, a voltage between a voltage supplied through the data line 111 and a voltage (that is, a voltage of the ground potential) supplied through the common wiring line 131 is applied to a liquid crystal layer corresponding to the pixel by ON of the thin film transistor.

In the substrate 50, a predetermined light shielding layer, such as a metallic film, is formed on a transparent substrate (back side of the drawing) formed of glass, quartz, or resin, for example, such that a region portion corresponding to a pixel is set as a light transmissive region and the other region portions are set as a light shielding region. Therefore, between pixels, a light shielding layer 51 is formed in the Y-axis direction and the light shielding layer 52 is formed in the X-axis direction. In addition, when the substrate 50 and the substrate 100 are made to overlap each other, the light shielding layer 51 is made to overlap the data line 111 and the light shielding layer 52 is made to overlap the scanning line 121, the common wiring line 131, and a thin film transistor (not shown).

Next, the appearance of wiring lines formed corresponding to each pixel including a thin film transistor will be described in detail with reference to the drawings. Moreover, in the following explanation, in order to make the present embodiment easily understood, a state before all wiring lines are finished eventually will be described first and then a state where all wiring lines are finished eventually will be described.

Figure 3:
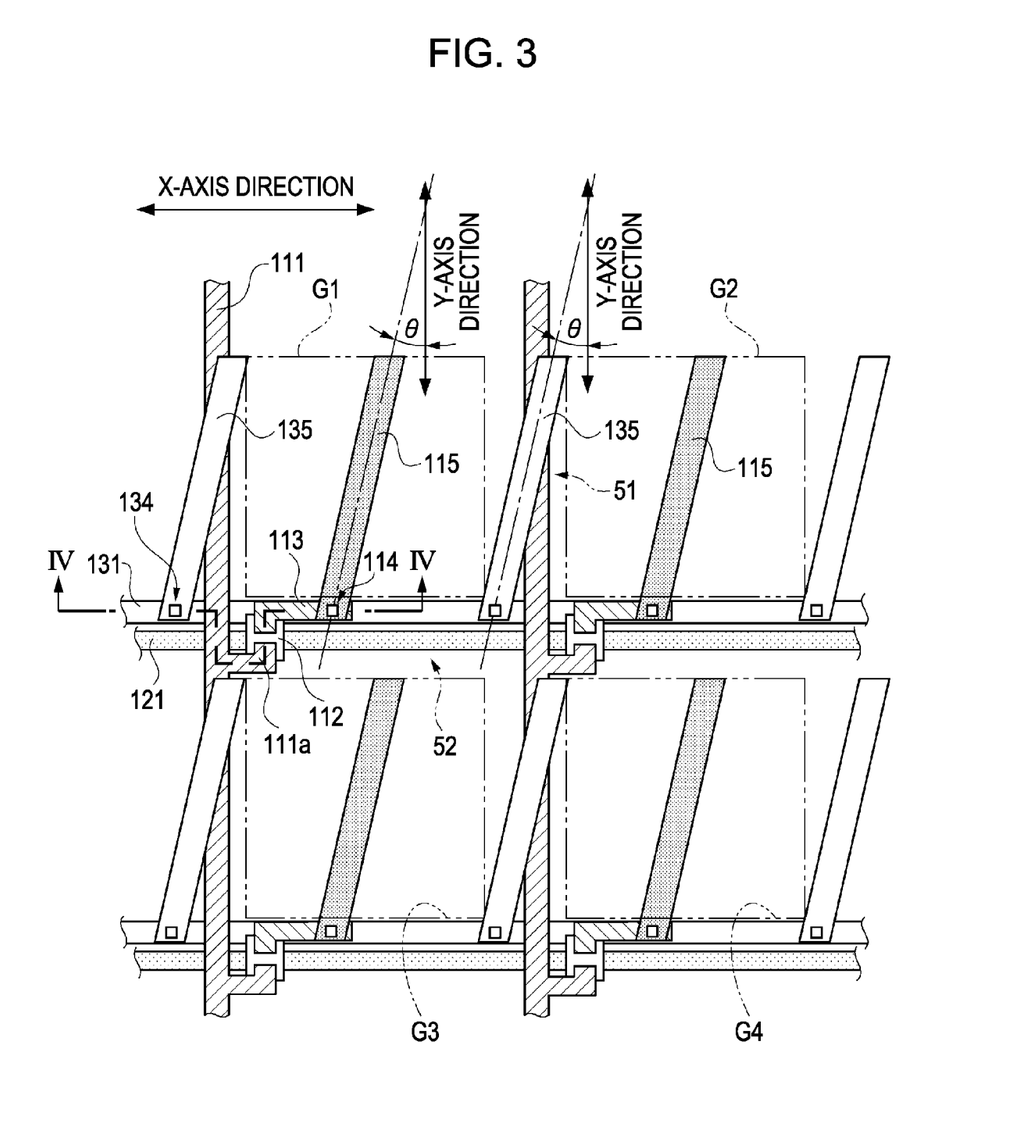
FIG. 3 is a schematic view illustrating the appearance of wiring lines before all wiring lines are finished eventually for pixels.

FIG. 3 is an explanatory view schematically illustrating the appearance of wiring lines before all wiring lines are finished eventually and shows the appearance of wiring lines formed corresponding to four pixels illustrated in the upper left portion of the liquid crystal device 15 in FIG. 2.

As shown in the drawing, a thin film transistor configured to include a source electrode 111a formed by extension of the wiring line of the data line 111, a gate insulating layer 112 formed with a channel region, the scanning line 121 serving as a gate electrode, and a drain electrode 113 is formed near a point of intersection of the scanning line 121 and the data line 111. In addition, the drain electrode 113 is connected to a pixel electrode 115 formed on an insulating layer, which will be described later, by a contact hole 114. Accordingly, when the thin film transistor is turned on by a voltage supplied to the scanning line 121, that is, a gate electrode, a voltage supplied to the data line 111 is applied to the pixel electrode 115 through the thin film transistor.

The pixel electrode 115 is formed near the middle of a region of a pixel G1 (similar for pixels G2, G3, and G4) and is formed to extend in a state of being inclined in a direction after clockwise rotation of $\theta°$ ($0<\theta<90$) with respect to the Y-axis direction. Thus, since the pixel electrode 115 is formed within the pixel region, the pixel electrode 115 is formed by a transparent electrode (for example, an ITO). In addition, when a decrease in the light amount of transmitted light of a pixel does not cause a practical influence, the pixel electrode 115 may be formed of a metallic material (for example, aluminum). In addition, the reason why the pixel electrode 115 is inclined with respect to the Y-axis direction will be described later.

The common wiring line 131 to which a voltage of the ground potential is supplied is connected to a common electrode 135 by a contact hole 134. The common electrode 135 is formed to extend in a direction along the pixel electrode 115, that is, in a direction of being inclined by $\theta°$ clockwise with respect to the Y-axis direction as shown in FIG. 3. In the present embodiment, the common electrode 135 is formed such that almost the entire common electrode 135 overlaps the light shielding layer 51. In this way, the protruding amount of the common electrode 135 to the inside of a pixel region can be suppressed. As a result, it can be suppressed that the pixel region serving as a light transmissive region becomes small by the common electrode 135, the light amount of illuminated light decreases, and a projected image becomes dark. Therefore, it becomes possible to form the common electrode 135 with a metallic material (for example, aluminum). In addition, since the conductivity of the common electrode 135 is improved, a transverse electric field can be efficiently generated. In addition, when the common electrode 135 does not overlap the light shielding layer 51 or partially overlaps the light shielding layer 51 due to structural constraints and the like, it is preferable to form the common electrode 135 using a transparent electrode (for example, an ITO).

Figure 4:
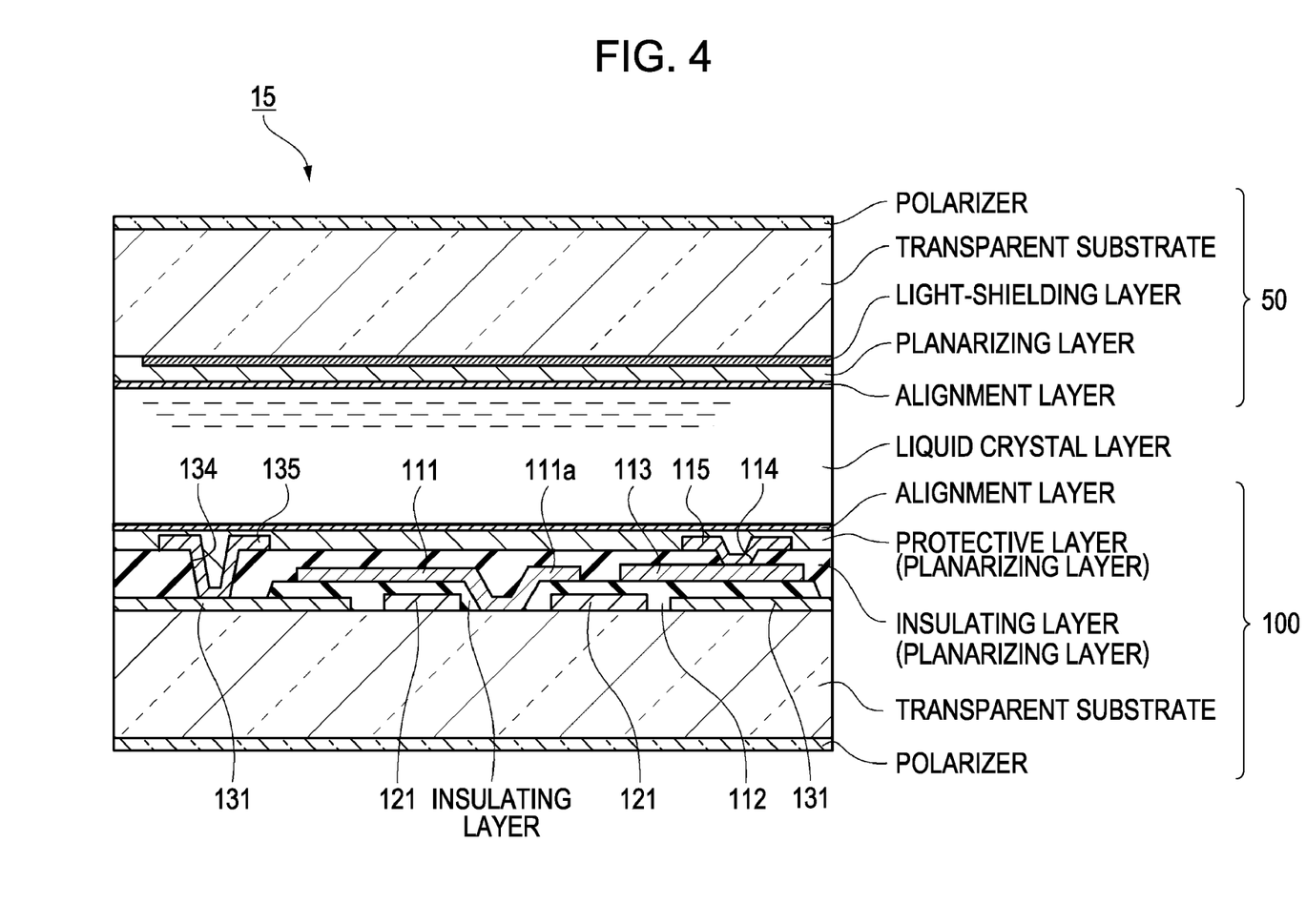
FIG. 4 is a schematic sectional view illustrating the cross section of a liquid crystal device.

Moreover, the common electrode 135 is formed in the same layer as the insulating layer formed with the pixel electrode 115. An explanation on this will be described using FIG. 4. FIG. 4 is a schematic sectional view, which illustrates the cross section taken along the line IV-IV of FIG. 3, for the liquid crystal device 15.

As shown in the drawing, in the substrate 100, the data line 111, the scanning line 121, the common wiring line 131, and a thin film transistor are laminated and formed on a surface of a transparent substrate facing the substrate 50 so as not to be electrically shorted to each other and with an insulating layer interposed therebetween, which is formed as needed. In addition, in the present embodiment, an insulating layer that covers the data line 111 is formed to have a flat surface by using a light transmissive material and the pixel electrode 115 and the common electrode 135 are formed on the flat surface of the same insulating layer that covers the data line 111. Moreover, in order to protect the pixel electrode 115 and the common electrode 135, a protective layer with a flat surface is covered thereon and an alignment layer that decides the initial alignment direction of liquid crystal molecules is formed on the protective layer. In addition, a polarizer is provided on a surface of the transparent substrate not facing the substrate 50.

Moreover, it is needless to say that the wiring configuration of the data line 111, the scanning line 121, the common wiring line 131, and the thin film transistor in the substrate 100 is not limited to those described above as long as the configuration is a configuration where the pixel electrode 115 and the common electrode 135 are formed on a flat surface of the same insulating layer.

In the substrate 50, as shown in the drawing, a light shielding layer is formed on a surface of a transparent substrate facing the substrate 100. In addition, the light shielding layer is covered with a planarizing layer and an alignment layer is formed on a surface of the planarizing layer. In addition, a polarizer is provided on a surface of the transparent substrate not facing the substrate 100. Moreover, in the substrate 50, between the transparent substrate and the planarizing layer, a color filter layer that allows light corresponding to a predetermined color to be transmitted therethrough may be formed in a light transmissive region corresponding to at least a pixel.

The liquid crystal device 15 is formed by interposing a liquid crystal layer between the substrate 50 and substrate 100, which are formed as described above, in a sealed state. Accordingly, in the liquid crystal device 15, it becomes possible to generate an electric field in a horizontal direction parallel to the substrate 100 (hereinafter, simply referred to as a 'transverse electric field') between the pixel electrode 115 and the common electrode 135 and to rotate liquid crystal molecules of the liquid crystal layer within the surface of the substrate 100. In addition, although a voltage of the ground potential is supplied to the common electrode 135 in present embodiment, a common voltage value having a predetermined voltage value including the voltage of the ground potential may be supplied.

Figure 5A:
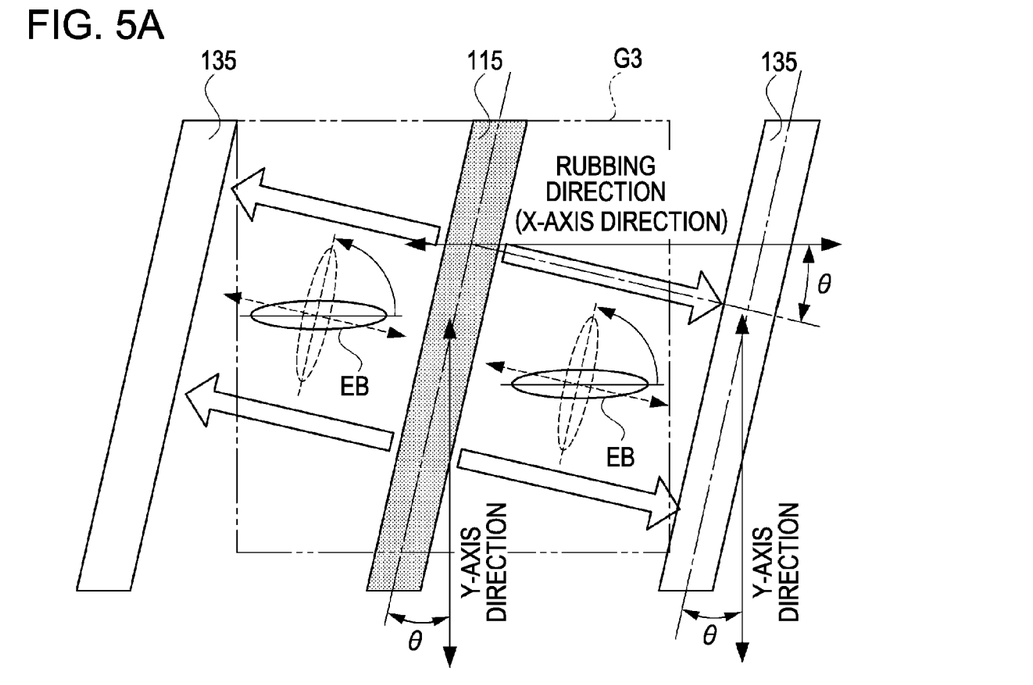
FIG. 5A is a schematic view illustrating a normal rotation state and FIG. 5B is a schematic view illustrating a reverse rotation state different from the normal rotation state.
Figure 5B:
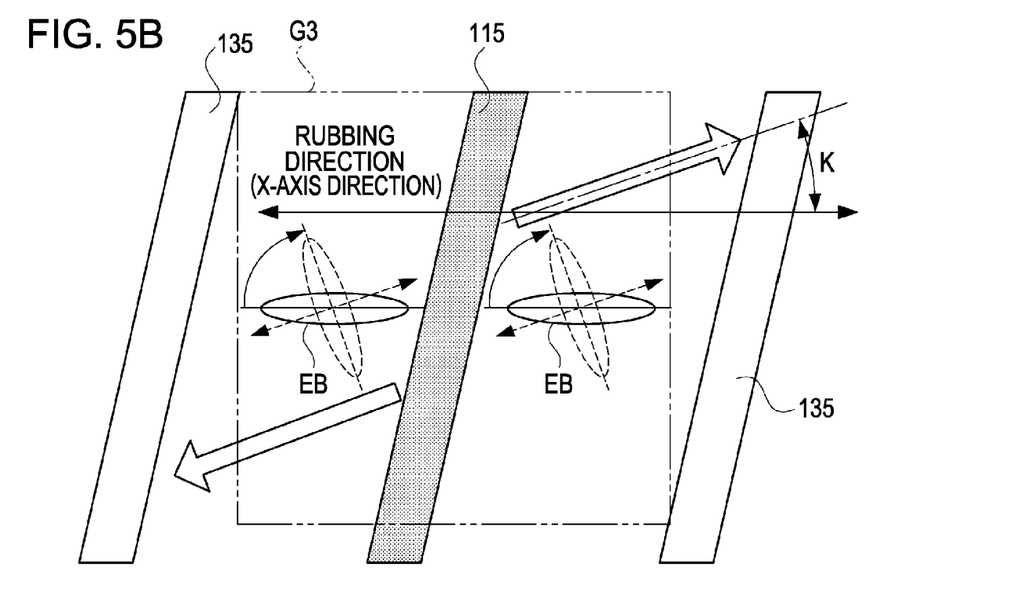

Next, a rotation operation of a liquid crystal molecule performed in the liquid crystal device 15 will be described with reference to FIGS. 5A and 5B. FIGS. 5A and 5B are schematic views illustrating a liquid crystal molecule EB that rotates according to the transverse electric field in the pixel G3 as an example. FIG. 5A shows a normal rotation state of the liquid crystal molecule EB, and FIG. 5B shows a different rotation state (that is, reverse rotation) of the liquid crystal molecule EB from the normal rotation state. Here, an explanation will be made using, as the liquid crystal molecule EB, negative liquid crystal whose polarization direction is perpendicular to the alignment direction. In addition, positive liquid crystal whose polarization direction is the same as the alignment direction may also be used as the liquid crystal molecule EB.

As shown in FIG. 5A, in an initial state where a voltage is not applied to the pixel electrode 115, the initial alignment direction of the liquid crystal molecule EB is set to the X-axis direction perpendicular to the Y-axis direction in order not to allow illuminated light having the Y-axis direction as the polarization direction to be transmitted. Accordingly, the rubbing direction of the alignment layer is set to the X-axis direction. In addition, the transverse electric field generated between the common electrode 135 and the pixel electrode 115 to which a voltage supplied from the data line 111 is applied is generated in a direction perpendicular to the extending direction of the pixel electrode 115, that is, in a direction after clockwise rotation of θ° with respect to the X-axis direction as indicated by the white arrow since the common electrode 135 is formed almost in parallel with the pixel electrode 115. As a result, as shown by a dotted line in the drawing, the liquid crystal molecule EB rotates uniformly and stably in a direction in which the total rotation angle is small, that is, in a counterclockwise direction. This is the reason why the pixel electrode 115 (and the common electrode 135) is inclined with respect to the Y-axis direction. Accordingly, the pixel electrode 115 (and the common electrode 135) may also be formed to extend in a state of being inclined in a direction after counterclockwise rotation of θ° (0<θ<90) with respect to the Y-axis direction as well as the clockwise direction with respect to the Y-axis direction.

At this time, the rotation angle of the liquid crystal molecule EB is controlled for every pixel by a voltage applied to the pixel electrode 115. In this manner, light modulation of the illuminated light can be performed for every pixel. As a result, the liquid crystal device 15 capable of performing light modulation correctly according to the voltage applied to the pixel electrode 115 while making the viewing angle distribution of contrast symmetrical as described above can be acquired by setting the X-axis direction as the initial alignment direction.

However, as shown in FIG. 5B, when a transverse electric field other than the transverse electric field shown in FIG. 5A, particularly a transverse electric field in an upward direction, that is, a direction after counterclockwise rotation of an angle K (K>0) with respect to the X-axis direction as indicated by the white arrow in the drawing is added due to a voltage applied to the pixel electrode 115 of an adjacent pixel (for example, the pixel G1), the direction of the transverse electric field applied to the liquid crystal molecule EB is disturbed. In addition, for example, when the transverse electric field added to the liquid crystal molecule EB becomes a transverse electric field in a direction after counterclockwise rotation of the angle K with respect to the X-axis direction as indicated by the white arrow in the drawing, the rotational direction of the liquid crystal molecule EB rotates in a direction in which the rotation angle is small, that is, in a clockwise direction as indicated by a dotted line in the drawing. In addition, although the liquid crystal molecule EB does not rotate clockwise, the transverse electric field that should be generated according to the voltage applied to the pixel electrode 115 is disturbed by the size or direction of the added transverse electric field. As a result, there is a possibility that the liquid crystal device 15 will not perform light modulation correctly for every pixel according to the voltage applied to the pixel electrode 115.

Figure 6:
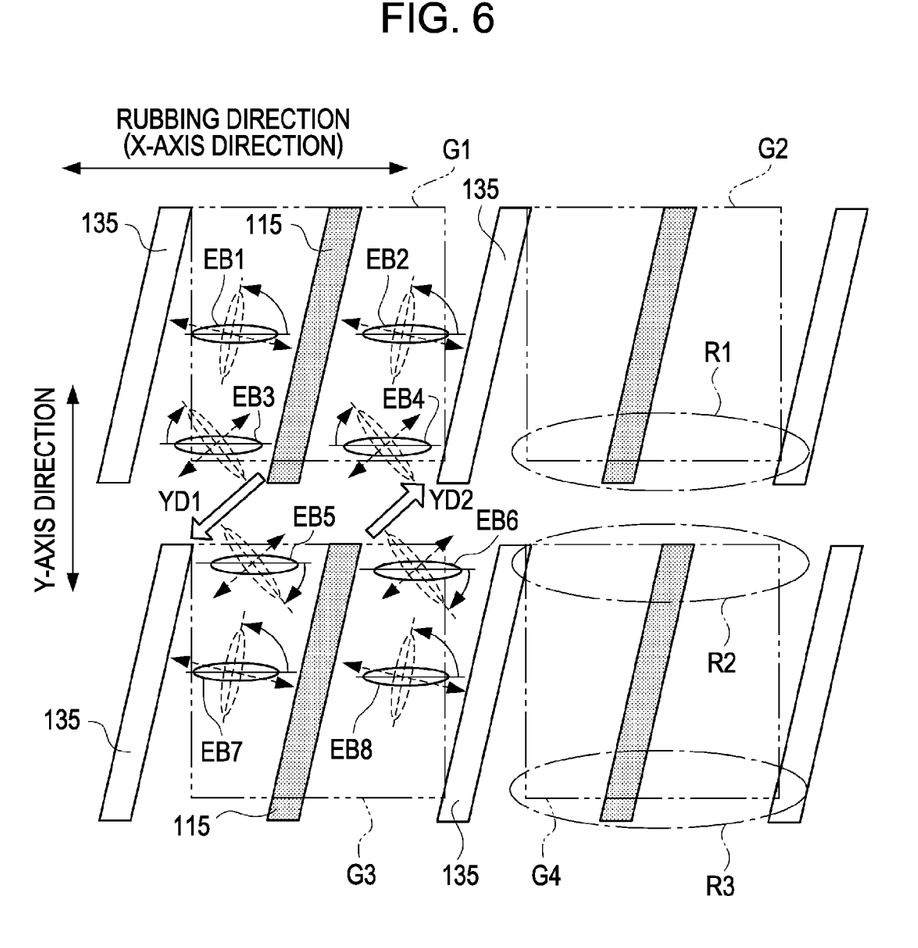
FIG. 6 is a schematic view illustrating the situation of generation of an electric field, which is generated between adjacent pixels.

As described above, when a distance between pixels is shortened for high resolution, there is a possibility that the liquid crystal device 15 will actually become a liquid crystal device which cannot perform light modulation correctly. This will be described with reference to FIG. 6. FIG. 6 is a schematic view illustrating the situation of generation of a transverse electric field, which is generated between adjacent pixels in the pixels G1 to G4.

As shown in FIG. 6, when the distance between pixels becomes short, a transverse electric field YD1 (white arrow) in a direction after counterclockwise rotation in a range of 0° to 90° with respect to the X-axis direction is generated, for example, between the pixel electrode 115 of the pixel G1 and the common electrode 135 of the pixel G3 shown at the left side of the drawing. Moreover, similarly, a transverse electric field YD2 (white arrow) in a direction after counterclockwise rotation in a range of 0° to 90° with respect to the X-axis direction is generated between the pixel electrode 115 of the pixel G3 and the common electrode 135 of the pixel G1 shown at the right side of the drawing.

As a result, as shown in the drawing, for example, liquid crystal molecules EB1 and EB2 located approximately in the middle of a region of the pixel G1 and liquid crystal molecules EB7 and EB8 located approximately in the middle of a region of the pixel G3 rotate correctly counterclockwise, but a liquid crystal molecule EB3 in the region of the pixel G1 located to face the pixel G3 rotates clockwise (reverse twist) by the transverse electric field YD1 and a liquid crystal molecule EB4 in the region of the pixel G1 located to face the pixel G3 similarly rotates clockwise (reverse twist) by the transverse electric field YD2.

Similarly, the liquid crystal molecules EB7 and EB8 located approximately in the middle of a region of the pixel G3 rotate correctly counterclockwise, but a liquid crystal molecule EB5 in the region of the pixel G3 located to face the pixel G1 rotates clockwise (reverse twist) by the transverse electric field YD1 and a liquid crystal molecule EB6 in the region of the pixel G3 located to face the pixel G1 similarly rotates clockwise (reverse twist) by the transverse electric field YD2.

Although the explanation is omitted, such a state where the liquid crystal molecule EB does not rotate correctly occurs between the pixels G2 and G4 and similarly, between all pixels that are formed in the liquid crystal device 15 and are adjacent to each other in the Y-axis direction. Therefore, as illustrated for the pixels G2 and G4, there is a possibility that the transverse electric fields will be disturbed in regions R1, R2, and R3, in which pixels are adjacent to each other particularly in the Y-axis direction, due to influences of voltages applied to the pixel electrodes 115 adjacent to each other and a state where the liquid crystal molecule EB cannot rotate correctly will occur in a portion where the transverse electric field is disturbed. As a result, the liquid crystal device 15 which cannot perform light modulation correctly is obtained.

For this reason, in the liquid crystal device 15 according to the present embodiment, disturbance of the transverse electric field generated in a pixel region is suppressed between such pixels adjacent to each other in the Y-axis direction. This will be described with reference to FIG. 7.

Figure 7:
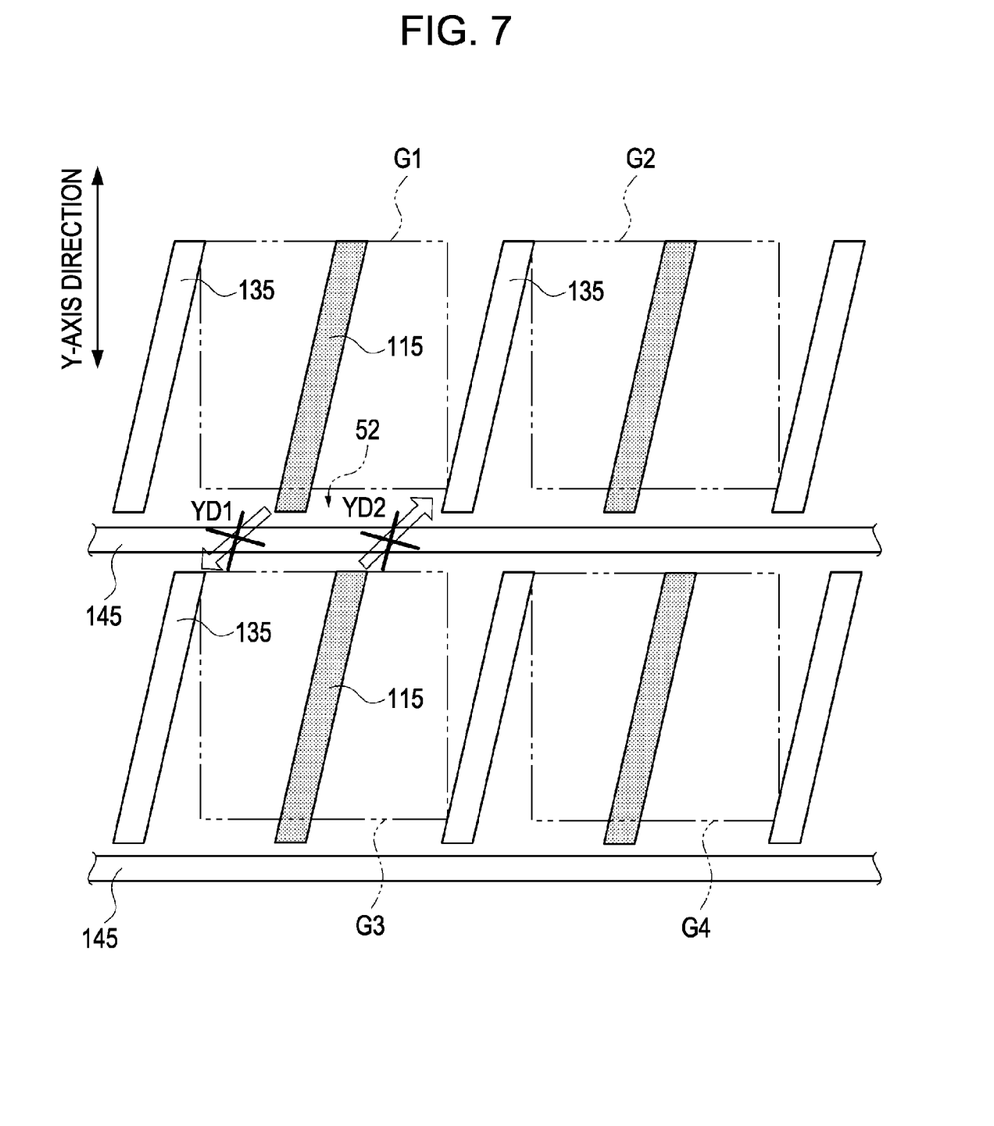
FIG. 7 is a schematic view illustrating a state in which all wiring lines are finished eventually for a pixel.

FIG. 7 is a schematic view illustrating a state, in which all wiring lines are finished eventually, for a pixel formed in the liquid crystal device 15 of the present embodiment. In addition, in FIG. 7, elements shown in FIG. 3 are omitted except for the pixel electrode 115 and the common electrode 135. As shown in FIG. 7, in the liquid crystal device 15 of the present embodiment, a shielding electrode 145 is formed between regions of pixels (for example, the pixel G1 and the pixel G3, the pixel G2 and the pixel G4, etc.) adjacent to each other in the Y-axis direction.

Thus, it is possible to suppress an influence of the transverse electric field from the adjacent pixel electrode 115 by forming the shielding electrode 145 between the pixel regions adjacent to each other in the Y-axis direction. That is, for example, for the pixel G1, the transverse electric field YD2 generated between the common electrode 135 located at the right side of the pixel G1 and the voltage applied to the pixel electrode 115 of the pixel G3 adjacent to the pixel G1 in the Y-axis direction in FIG. 6 is generated between the pixel G1 and the shielding electrode 145. Accordingly, the influence on the pixel G1 is suppressed. In addition, for the pixel G3, the transverse electric field YD1 generated between the common electrode 135 located at the left side of the pixel G3 and the voltage applied to the pixel electrode 115 of the pixel G1 adjacent to the pixel G3 in the Y-axis direction in FIG. 6 is generated between the pixel G3 and the shielding electrode 145. Accordingly, the influence on the pixel G3 is suppressed. As a result, since an influence of the transverse electric field generated by the adjacent pixel electrode 115 is suppressed between pixels adjacent to each other in the Y-axis direction, the liquid crystal molecule EB can be correctly rotated according to a voltage applied to the pixel electrode 115 of a pixel to which the liquid crystal molecule EB belongs.

Furthermore, in the present embodiment, the shielding electrode 145 is formed at the position overlapping the light shielding layer 52. In this case, since the shielding electrode 145 does not exist in the pixel region, it is possible to form the shielding electrode 145 with a metallic material (for example, aluminum). Accordingly, it becomes possible to effectively suppress the transverse electric field YD1 or the transverse electric field YD2 since the conductivity of the shielding electrode 145 is improved. In addition, when the shielding electrode 145 does not overlap the light shielding layer 52 or partially overlaps the light shielding layer 52 due to structural constraints and the like, it is preferable to form the shielding electrode 145 using a transparent electrode.

Furthermore, in the present embodiment, the shielding electrode 145 is formed on a surface of the same layer as the insulating layer (refer to FIG. 4) in which the pixel electrode 115 and the common electrode 135 are formed. In this case, since the shielding electrode 145 is interposed in a portion assumed that the transverse electric field generated between the adjacent pixel electrode 115 and the common electrode 135 is largest, it becomes possible to suppress the transverse electric field effectively. In addition, since the shielding electrode 145 is formed on a surface of the same layer as an insulating layer, it is not necessary to form an insulating layer between the shielding electrode 145 and the pixel electrode 115 or between the shielding electrode 145 and the common electrode 135. Therefore, there is no possibility of occurrence of a problem that the amount of light transmitted through a pixel is reduced since a formed insulating layer exists in a light transmissive region. Moreover, since the pixel electrode 115, the common electrode 135, and the shielding electrode 145 can also be formed by a deposition process using one mask, the formation process becomes easy.

Figure 8:
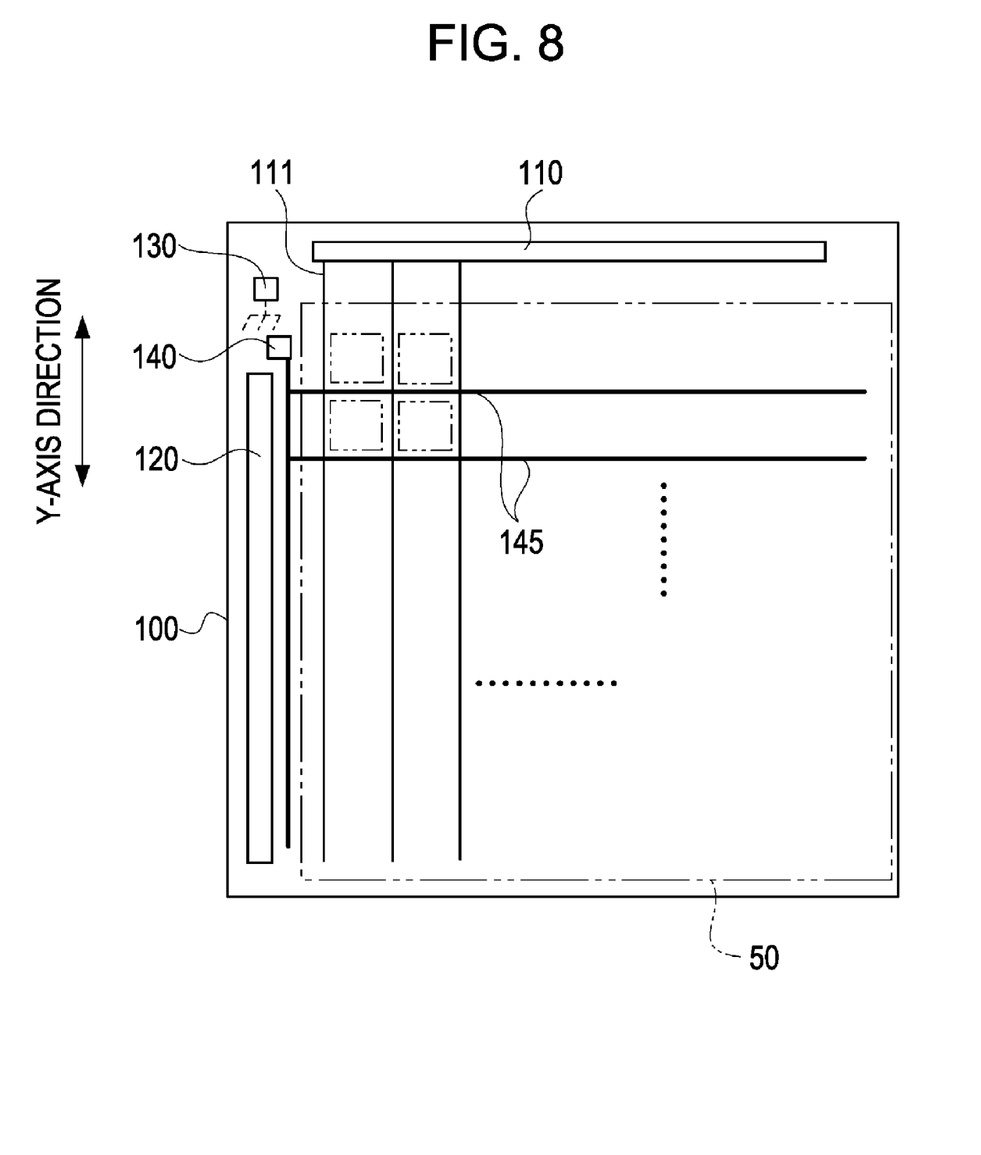
FIG. 8 is a schematic view illustrating the situation of wiring line formation of a shielding electrode.

Furthermore, in the present embodiment, it is assumed that a voltage other than the voltage of the ground potential is applied to the shielding electrode 145. Accordingly, the shielding electrode 145 may be formed by a wiring line as shown in FIG. 8, for example. That is, as shown in FIG. 8, in a peripheral portion of the substrate 100, an electrode terminal 140 used to supply a voltage applied to the shielding electrode 145 is formed on a transparent substrate. Then, the shielding electrodes 145 formed between regions of all pixels adjacent to each other in the Y-axis direction are connected to the electrode terminal 140. In addition, FIG. 8 is a schematic view illustrating the substrate 100 in FIG. 2, and the scanning line 121 and the common wiring line 131 are not shown in FIG. 8.

As for a voltage actually applied to the electrode terminal 140, that is, the shielding electrode 145, it is preferable that an optimal voltage value including a plus potential or a negative potential with respect to the ground potential be examined and set beforehand by experiments and the like. In addition, in case where the optimal voltage changes with a pixel in which the liquid crystal molecule EB is driven to rotate by ON of the thin film transistor through the scanning line 121, it is also possible to set a plurality of voltages applied to the shielding electrode 145 and to switch the plurality of set voltages, for example, at the timing when a voltage is applied to the pixel electrode 115 through the data line 111 so that the voltage is applied to the shielding electrode 145.

Furthermore, a first direction, a second direction, a first substrate, a second substrate, a first light shielding layer, a second light shielding layer, a first electrode, a second electrode, and a third electrode defined in the appended claims correspond as follows in the present embodiment. The X-axis direction corresponds to the first direction, and the Y-axis direction corresponds to the second direction. The substrate 100 corresponds to the first substrate, and the substrate 50 corresponds to the second substrate. The light shielding layer 51 corresponds to the first light shielding layer, and the light shielding layer 52 corresponds to the second light shielding layer. Moreover, the pixel electrode 115 corresponds to the first electrode, the common electrode 135 corresponds to the second electrode, and the shielding electrode 145 corresponds to the third electrode.

As described above, according to the liquid crystal device 15 of the present embodiment, it can be suppressed that transverse electric fields in adjacent pixel regions are disturbed by each other between the adjacent pixel regions. Accordingly, light modulation of illuminated light can be correctly performed for every pixel by the voltage supplied through the data line 111. As a result, degradation of the display quality can be suppressed.

Having described the embodiment of the invention through the examples, the invention is not limited thereto but various changes and modifications thereof may be made without departing from the spirit and scope of the invention. Hereinafter, modifications will be described.

First Modification

Figure 9:
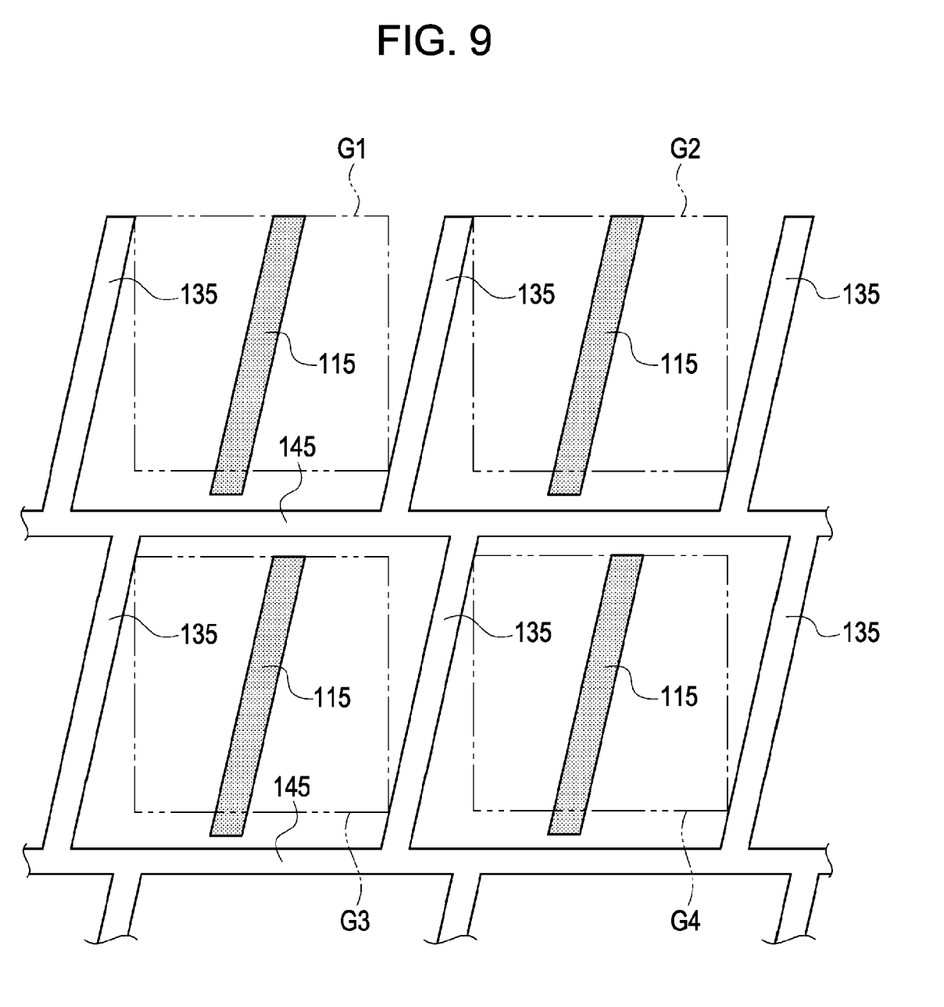
FIG. 9 is a schematic view illustrating a state where a shielding electrode and a ground electrode are electrically connected in a first modification.

In the above-described embodiment, the shielding electrode 145 formed between pixels adjacent to each other in the Y-axis direction is an independent electrode which is not electrically connected to the common electrode 135. However, the shielding electrode 145 may be an electrode electrically connected to the common electrode 135 without being limited to those described above. This modification is shown in FIG. 9. As shown in FIG. 9, the pixel electrode 115 in each pixel is surrounded without a gap and with a ground potential by the common electrode 135 and the shielding electrode 145. Therefore, most transverse electric fields generated by the adjacent pixel electrodes 115 are blocked.

Moreover, since a gap is not formed between the common electrode 135 and the shielding electrode 145, a problem that the common electrode 135 and the shielding electrode 145 are electrically shorted does not occur when the common electrode 135 and the shielding electrode 145 are formed by deposition using a mask. Accordingly, it is preferable to control the deposition so that the gap between the shielding electrode 145 and the pixel electrode 115 is secured and the load occurring when forming the electrodes is alleviated.

Figure 10:
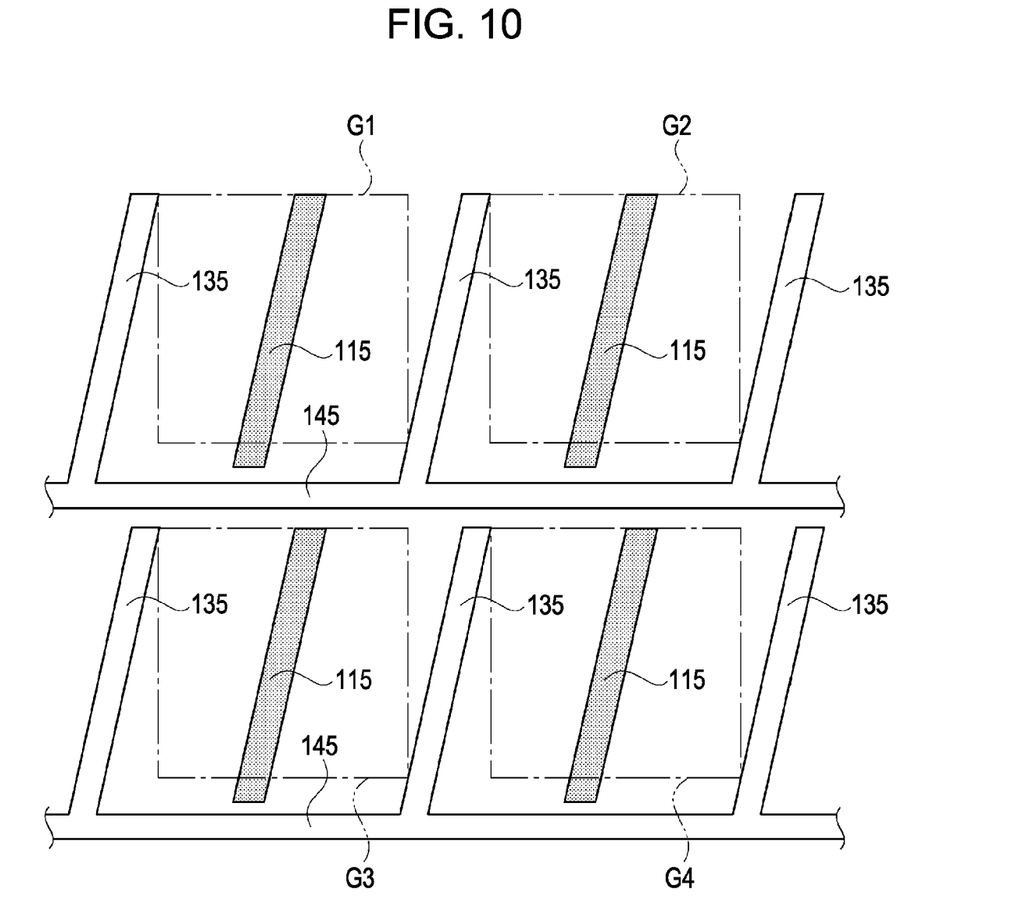
FIG. 10 is a schematic view illustrating another state where a shielding electrode and a ground electrode are electrically connected in the first modification.

Furthermore, in this modification, the shielding electrode 145 may be formed to be electrically connected to at least one end of the common electrode 135, for example, as shown in FIG. 10. In this case, since the pixel electrode 115 can be surrounded with almost no gap and with the ground potential by the common electrode 135 and the shielding electrode 145, most of the transverse electric field generated by the adjacent pixel electrode 115 can be blocked.

Second Modification

In the above-described embodiment, all of the liquid crystal molecules EB are uniformly rotated counterclockwise and light modulation of illuminated light is performed for every pixel by setting the rubbing direction as the X-axis direction and making the extending directions of the pixel electrode 115 and the common electrode 135 inclined with respect to the Y-axis direction. However, it goes without saying that the invention is not necessarily limited to those described above. For example, the extending directions of the pixel electrode 115 and the common electrode 135 may be set as the Y-axis direction, and the rubbing direction may be inclined with respect to the X-axis direction.

Figure 11:
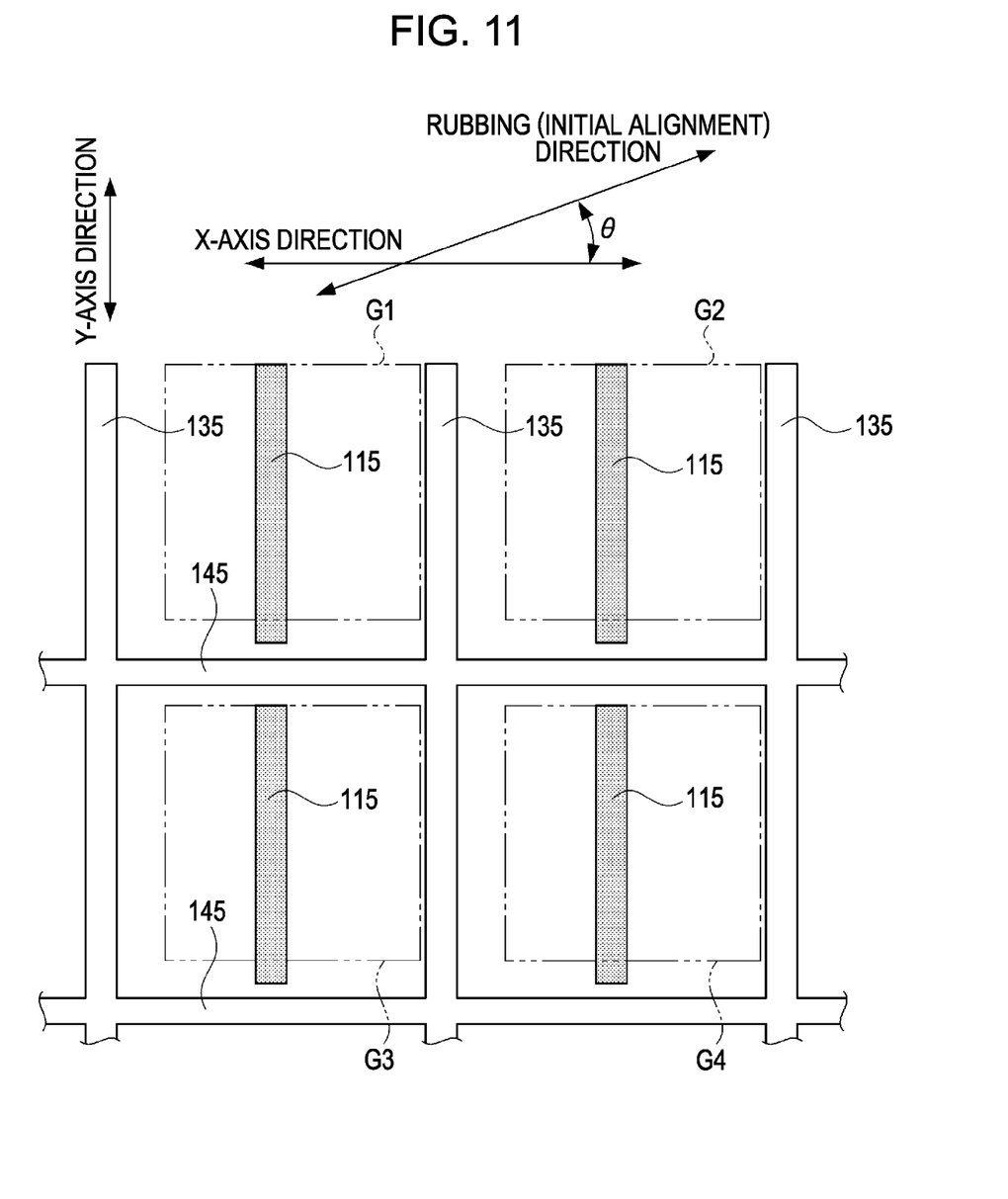
FIG. 11 is a schematic view illustrating a wiring state of a pixel electrode, a ground electrode, and a shielding electrode in a second modification.

This modification is shown in FIG. 11. FIG. 11 is a schematic view illustrating an example where the common electrode 135 and the shielding electrode 145 are electrically connected to each other, and each pixel electrode 115 and the common electrode 135 are formed in a direction of matching the Y-axis direction. In addition, the rubbing direction is a direction after counterclockwise rotation of the angle θ with respect to the X-axis direction. In this way, the liquid crystal molecules EB in the pixels G1 to G4 can rotate stably in a predetermined direction, as can be easily understood from the above explanation. As a result, it is possible to provide the liquid crystal device 15 capable of performing light modulation of illuminated light correctly while suppressing an influence of the transverse electric field generated from the adjacent pixel electrode 115 to the common electrode 135.

Furthermore, in this modification, the shielding electrode 145 and the common electrode 135 may not be electrically connected to each other similar to the above-described embodiment. In this case, as described above, a voltage applied to the shielding electrode 145 in order to suppress disturbance of the transverse electric field caused by the adjacent pixel can be set to have an optimal voltage value.

Third Modification

In the above embodiment, the explanation has been made in a condition where the liquid crystal device 15 is used as a light modulation device in the projector 10. However, the invention is not necessarily limited thereto. For example, the liquid crystal device 15 may be used as a direct view type display device. In this case, it is preferable that a backlight using a fluorescent tube or the like be integrally formed on a back surface of the liquid crystal device 15. Since such a liquid crystal device 15 can correctly display a high-resolution image as described above, the liquid crystal device 15 may be provided as a direct view type display device in electronic apparatuses, such as a television, a digital still camera, a digital camcorder, a mobile phone, and a computer. In this way, an electronic apparatus that provides an image with satisfactory display quality can be realized.

The entire disclosure of Japanese Patent application No. 2008-139048, field May 28, 2008 is expressly incorporated by reference herein.

What is claimed is:

1. A liquid crystal device having a plurality of pixels arrayed in a matrix along a first direction and a second direction crossing the first direction, comprising:
    a first substrate;
    a second substrate disposed opposite the first substrate;
    a first light shielding layer that is formed along the second direction in a region, which is positioned between the pixels adjacent to each other in the first direction, of a surface of the first substrate facing the second substrate;
    a first electrode that is formed within the pixel of a surface of the second substrate facing the first substrate and has an electrode portion extending in a predetermined direction;
    a second electrode that is disposed corresponding to a region, which is positioned between the pixels adjacent to each other in the first direction, of the surface of the second substrate facing the first substrate and that is formed such that at least a part thereof overlaps the first light shielding layer in plan view and has an electrode portion extending in a direction along the electrode portion of the first electrode;
    a third electrode that has an electrode portion formed along the first direction in a region, which is positioned between the pixels adjacent to each other in the second direction, of the surface of the second substrate facing the first substrate; and
    a liquid crystal layer that is interposed between the first and second substrates and is driven by an electric field generated between the first and second electrodes.

2. The liquid crystal device according to claim 1, wherein the predetermined direction in which each of the electrode portion of the first electrode and the electrode portion of the second electrode extends is a direction crossing each of the first and second directions.

3. The liquid crystal device according to claim 1, wherein the third electrode is electrically connected to the second electrode.

4. The liquid crystal device according to claim 1, wherein the first light shielding layer is formed to have a predetermined width, and
    the second electrode has a width smaller than the predetermined width and is disposed and formed to be placed within the predetermined width in plan view.

5. The liquid crystal device according to claim 1, wherein the second substrate has a plurality of insulating layers formed, and
    the second and third electrodes are formed on the same insulating layer as an insulating layer in which the first electrode is formed.

6. The liquid crystal device according to claim 1, further comprising:
    a second light shielding layer that is formed along the first direction in a region, which is positioned between the pixels adjacent to each other in the second direction, of the surface of the first substrate facing the second substrate,
    wherein the third electrode is formed at a position where at least a part of the third electrode overlaps the second light shielding layer in plan view.

7. The liquid crystal device according to claim 6, wherein the second light shielding layer is formed to have a predetermined width, and
    the third electrode has a width smaller than the predetermined width and is formed to extend within the predetermined width in plan view.

8. The liquid crystal device according to claim 6, wherein an end of the electrode portion of the first electrode is formed to extend up to a portion overlapping the second light shielding layer.

9. The liquid crystal device according to claim 1, wherein at least one of the first electrode, the second electrode, and the third electrode is a transparent electrode.

10. An electronic apparatus comprising the liquid crystal device according to claim 1.

* * * * *